A. ATWOOD.
Heating Stove.
No. 176. Reissued Sept. 17, 1850.
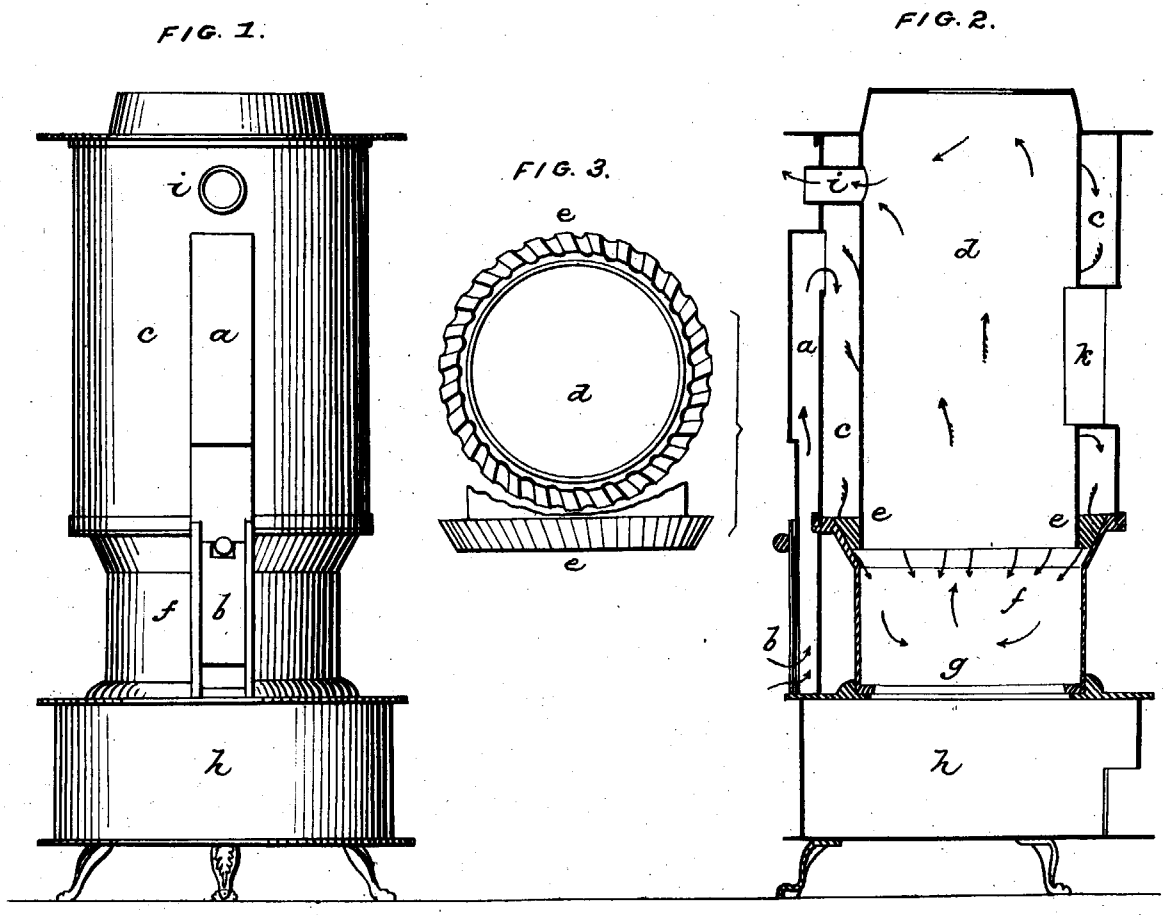
N. PETERS, Photo-Lithographer, Washington, D. C.

UNITED STATES PATENT OFFICE.

ANSON ATWOOD, OF TROY, NEW YORK.

IMPROVEMENT IN STOVES.

Specification forming Letters Patent No. 7,356, dated May 14, 1850; Reissue No. 176, dated September 17, 1850.

*To all whom it may concern:*

Be it known that I, ANSON ATWOOD, of Troy, Rensselaer county, State of New York, have invented certain Improvements in Stoves, Furnaces, &c.; and I do hereby declare that the following is a full, clear, and exact description of the principle or character which distinguishes them from all other things before known, and of the usual manner of making, modifying, and using the same, reference being had to the accompanying drawings, of which—

Figure 1 is a back view; Fig. 2, a section; Fig. 3, showing the ring *e* and the grooves.

Many plans have been devised for the purpose of consuming smoke in the various species of stoves, furnaces, &c., by the admission of air above the fuel, which, mixing with the inflammable gases and smoke in a heated state, would consume them, provided the gases, &c., were at a sufficiently high temperature to ignite after being mixed with a stream of cold air. This difficulty of maintaining a temperature high enough to ignite the gases has been the cause of failure in most instances, and another difficulty has been the imperfect intermixture of the inflammable gases with the atmospheric air, which prevented their inflammation until they had become too cold to ignite.

In my plan I raise the air to a high temperature before it enters the fire-chamber, and cause it to impinge upon the surface of the burning fuel, so that the combustion is not checked in the least degree, as it would be if the air was cold; and the smoke, which arises only from imperfect combustion, is not formed, as the gases and the solid matter which rises with them are burned as soon as produced at the surface of the fuel. It has also this advantage, the blast being admitted above the fuel instead of below, the combustion is not impeded by the accumulation of ashes or by the swelling of bituminous coal, which choke the grates; and in locomotives the combustion is not affected by the packing of the fuel, caused by the jarring of the machine when in motion.

The form shown in the drawings is as applied to a common stove; but it is obvious that the same principle can be applied to any form of stove or furnace for generating heat.

In the drawings, *a* is a passage, provided with a register, *b*, through which the air passes from without to the air-chamber *c*, which surrounds the stove. The air is here raised to a high temperature, and passes from hence by the force of the draft and the expansion of the air by heat into the fire-chamber *d* through a series of apertures, which are formed by grooves in the ring *e*, which is conical on its outer surface where the grooves are made. This ring, attached to the upper part of the stove, fits into an inverse cone on the fire-box *f*. The grooves are cut in a spiral direction, and thus form apertures, through which the heated air rushes down upon the fuel in an oblique direction, giving itself a rotary motion, which insures a thorough mixture with the gases as they are formed from the fuel. *g* is the grate; *h*, the ash-pit; *i*, the chimney, and *k*, the fire-door.

There may be two or more rings with apertures or jets for introducing heated air onto or into the fire, and the air chamber may be located inside and above the fire, or on the sides or back of the fire-chamber, if desirable.

The rings or pieces through which the apertures are made may be of iron, fire-brick, soapstone, &c.

Having thus fully described my improvements in stoves, furnaces, &c., what I claim as new therein, and which I desire to secure by Letters Patent, is—

The air-chamber in which the air is heated previously to its admission to the fuel, in combination with the apertures by which the heated air is caused to impinge on the upper surface of the fuel, substantially in the manner and for the purposes as described.

ANSON ATWOOD.

Witnesses:

EDWARD EVERETT,

T. C. DONN.